US008870390B2

United States Patent
Davidson

(10) Patent No.: US 8,870,390 B2
(45) Date of Patent: Oct. 28, 2014

(54) LOW Z-HEIGHT PROJECTION SYSTEM FOR PROJECTING STRUCTURED LIGHT FOR 3D IMAGING

(75) Inventor: Iain Davidson, Mountain View, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 147 days.

(21) Appl. No.: 13/609,852

(22) Filed: Sep. 11, 2012

(65) Prior Publication Data

US 2014/0071404 A1    Mar. 13, 2014

(51) Int. Cl.
*G03B 21/28* (2006.01)

(52) U.S. Cl.
USPC ............ 353/98; 353/30; 353/31; 353/37; 353/38; 353/101; 359/242; 359/247

(58) Field of Classification Search
CPC ... H04N 9/3197; H04N 9/3161; G02B 27/48; G02B 3/0056; G02B 5/02; G03B 21/208; G03B 33/06; G03B 21/2033
USPC ........... 353/20, 30, 31, 37, 38, 71, 88, 98, 99, 353/101; 359/237, 242, 247, 362, 364, 366, 359/372, 380; 348/743–747; 349/5, 7–9
See application file for complete search history.

(56) References Cited

U.S. PATENT DOCUMENTS

| | | | | |
|---|---|---|---|---|
| 5,959,704 A * | 9/1999 | Suzuki et al. | | 349/9 |
| 6,012,816 A * | 1/2000 | Beiser | | 353/122 |
| 6,252,623 B1 | 6/2001 | Lu et al. | | |
| 6,587,159 B1 * | 7/2003 | Dewald | | 348/744 |
| 6,964,484 B2 * | 11/2005 | Gupta et al. | | 353/69 |
| 7,891,818 B2 * | 2/2011 | Christensen et al. | | 353/31 |
| 8,172,403 B2 * | 5/2012 | Silverstein et al. | | 353/38 |
| 2003/0081150 A1 * | 5/2003 | Li et al. | | 348/744 |
| 2005/0147135 A1 * | 7/2005 | Kurtz et al. | | 372/23 |
| 2006/0187414 A1 * | 8/2006 | Bell et al. | | 353/31 |
| 2007/0091321 A1 | 4/2007 | Hu et al. | | |
| 2007/0170365 A1 * | 7/2007 | Williams et al. | | 250/370.08 |
| 2010/0079581 A1 | 4/2010 | Russell et al. | | |
| 2010/0208149 A1 * | 8/2010 | Morikuni | | 348/744 |
| 2011/0169915 A1 | 7/2011 | Bloom et al. | | |
| 2013/0050803 A1 * | 2/2013 | Stowe et al. | | 359/292 |

* cited by examiner

*Primary Examiner* — Sultan Chowdhury
(74) *Attorney, Agent, or Firm* — Blakely Sokoloff Taylor & Zafman LLP

(57) ABSTRACT

A low Z-height projection system includes a display panel for displaying a grating pattern that has gratings extended in a first direction. A projection lens system is also included and projects the grating pattern displayed on the display panel onto a surface. The projection lens system is a truncated circular lens system that has a first lens width in the first direction and a second lens width in a second direction. The first lens width is less than the second lens width. The first and second directions are orthogonal.

17 Claims, 8 Drawing Sheets

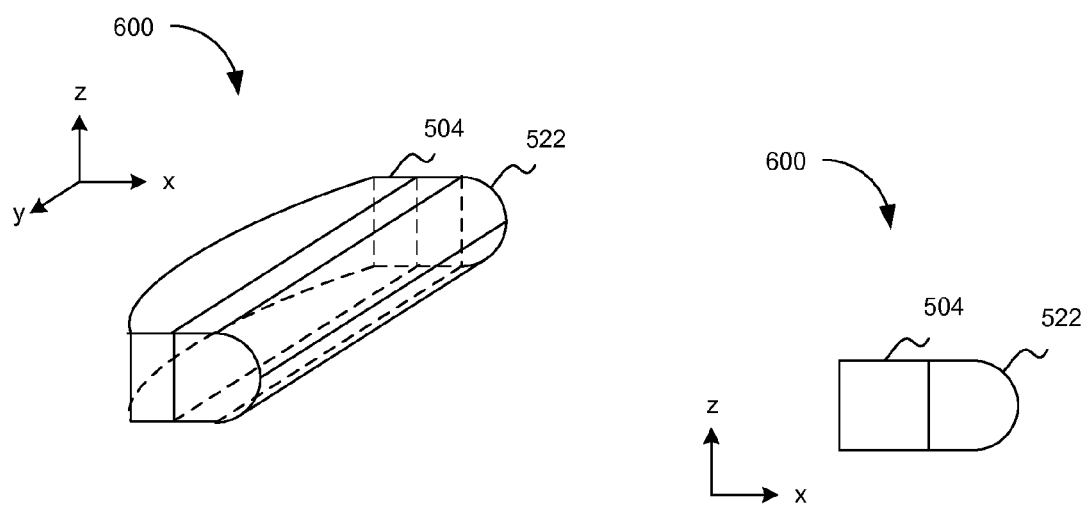
FIG. 13(a)
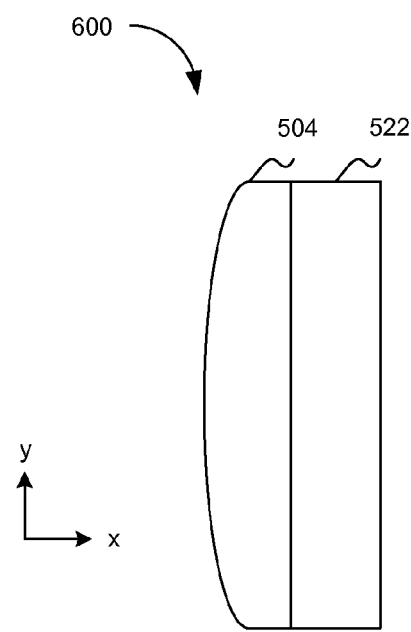
FIG. 13(b)
FIG. 13(c)

LOW Z-HEIGHT PROJECTION SYSTEM FOR PROJECTING STRUCTURED LIGHT FOR 3D IMAGING

BACKGROUND INFORMATION

1. Field of the Disclosure

This disclosure relates to a projection system, and, more particularly, to a low Z-height projection system for projecting structured light for 3D imaging.

2. Background

Recently, small footprint projectors using liquid-crystal-on-silicon (LCOS) or digital-light-processor (DLP) display panels known as pico projectors have been available. Pico projectors are small portable projectors. Due to its compact size, a pico projector may be included in a mobile phone, so that the mobile phone can project the display onto any surface such as wall.

A pico projector may include a small LCOS display panel, which may be transmissive type or reflective type. Typically, a pico projector includes one or more light sources, a beam-splitter, an LCOS display panel, and a projection lens. Furthermore, the pico projector may be used for projecting structured light for 3D imaging. Typically, the structured light for 3D imaging includes a vertical grating pattern. The vertical grating pattern is projected onto a surface having a profile. The profile at a position, e.g., a protrusion or a recess relative to a flat surface, can be calculated from the deformation of the projected grating at that position. The deformation typically relates to the horizontal shift of the projected vertical grating from its image if the surface is flat without a profile.

A 3D imaging system includes a projector for projecting the structured light and a digital camera for detecting the deformation of the projected structured light. The 3D imaging system may further include a computer or a digital processor. It often requires that the projector be small, in order to reduce the overall dimensions of the 3D imaging system. In addition to providing the profile of a static 3D object, the 3D imaging system may also be used for gesture recognition for controlling a computer, gaming, as well as many other uses. A small projector for projecting structured light for gesture recognition is in especially high demand.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 13(a) illustrates an example schematic diagram of a combined orthogonal anamorphic lens including a first anamorphic lens and a second orthogonal anamorphic lens in accordance with the teachings of the present invention.

FIG. 13(b) illustrates an example cross-section of the combined orthogonal anamorphic lens of FIG. 13(a) in the x-y plane in accordance with the teachings of the present invention.

FIG. 13(c) illustrates an example cross-section of the combined orthogonal anamorphic lens of FIG. 13(a) in the x-z plane in accordance with the teachings of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

According to the teachings of the present disclosure, a low Z-height projection system may be constructed for projecting structured light for 3D imaging. In the illustrated examples, the optical axis is referred to as the x-axis and a cross-section of the projection system is referred to as the y-z plane. Since the projected structured light is a vertical grating pattern, it has variation in only one direction, which is in the y-axis. The grating pattern has no variation along the z-axis. Accordingly, asymmetric optics can be designed and used in accordance with the teachings of the present invention. For example, the optical system may include a truncated circular lens having a smaller lens width in the z-axis and a larger lens width in the y-axis, which will be referred to herewith as low Z-height optics.

Figure 1:
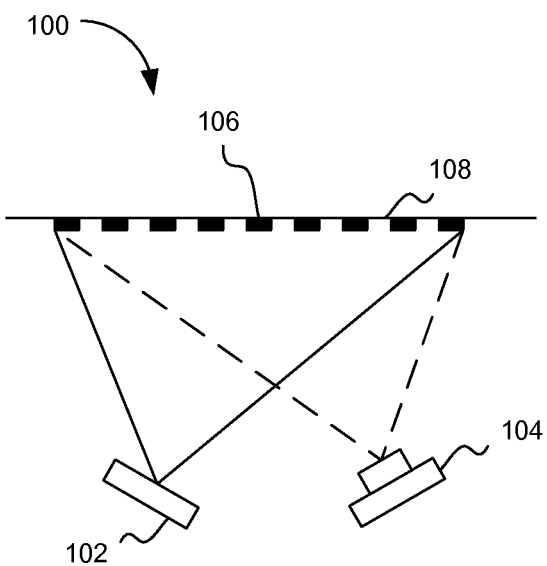
FIG. 1 illustrates a schematic diagram of a 3D imaging system.

FIG. 1 illustrates a schematic diagram of a 3D imaging system 100, including a structured light projector 102 and a digital camera 104, which are disposed at different locations. Projector 102 projects structured light, which is a grating pattern 106, onto a surface 108. Camera 104 detects the image of the grating pattern 106 formed on surface 108.

Figure 2:
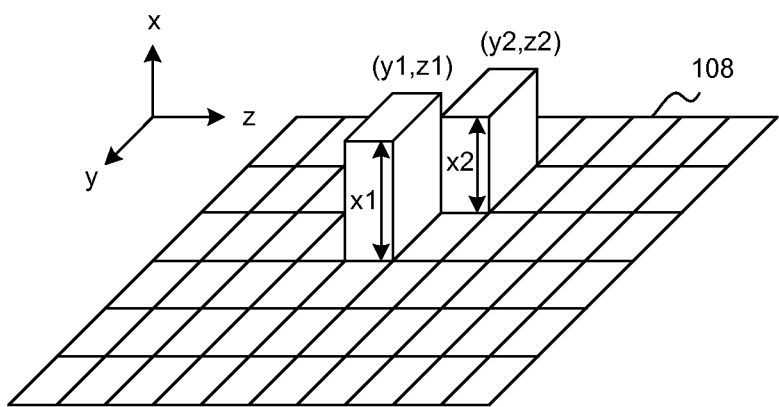
FIG. 2 illustrates a schematic diagram of a surface on a y-z plane having a profile or thickness in the x-axis.

FIG. 2 illustrates a schematic diagram of surface 108 on a y-z plane having a profile or a thickness in the x-axis. For example, FIG. 2 illustrates an element (y1,z1) of surface 108 has a thickness of x1. Similarly, an element (y2,z2) of surface 108 has a thickness of x2, and so on.

Figure 3:
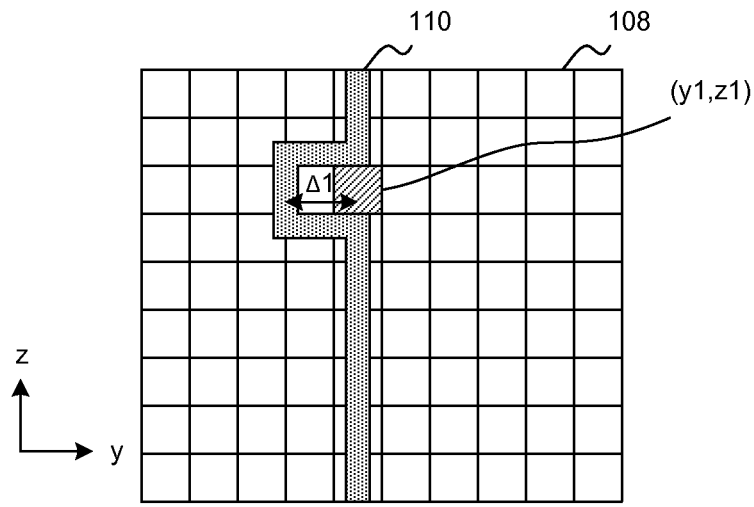
FIG. 3 illustrates a schematic diagram of a distorted fringe of the projected grating pattern on a surface having a profile.

FIG. 3 illustrates a schematic diagram of a distorted fringe 110 of a projected grating pattern, e.g., projected grating pattern 106 of FIG. 1, on surface 108 having a profile. Fringe 110 would be formed at the position of element (y1,z1) of surface 108, if surface 108 is flat. In other words, if the thickness x1 at element (y1,z1) is zero, projected grating pattern 106 is not distorted. If element (y1,z1) has a non-zero thickness x1, projected grating pattern 106 is distorted, and fringe 110 of element (y1,z1) is shifted horizontally for a distance Δ1. The direction of the shift, i.e., left or right, depends on whether element (y1,z1) is a protrusion or a recess. Based on the geometry, the thickness x1 can be derived from the measured horizontal shift Δ1. By scanning all elements (y1,z1), (y2,z2), . . . of surface 108, one can get the profile of surface 108. It is important to note that a 1D grating pattern is sufficient for generating a profile of a 2D surface.

Figure 4:
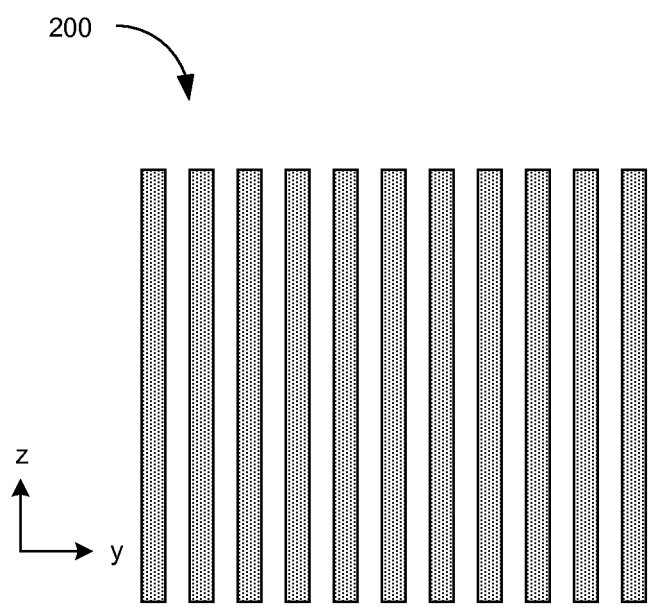
FIG. 4 illustrates an example schematic diagram of a vertical grating pattern projected by a LCOS projection system in accordance with the teachings of the present invention.

FIG. 4 illustrates an example schematic diagram of a vertical grating pattern 200 projected by a LCOS projection system (not shown) in accordance with the teachings of the present invention. As shown in the depicted example, vertical grating pattern 200 includes gratings extended in the z-axis. Grating pattern 200 may be characterized by one or a combination of: monochrome, color, binary, gray scale, polarization encode, and phase encode, among others. As shown, vertical grating pattern 200 has no variation in the z-axis. Vertical grating pattern 200 has variation only in the y-axis. Accordingly, the projection optics of the LCOS projection system projecting vertical grating pattern 200 requires less optical quality in the z-axis as compared to the y-axis.

Figure 5:
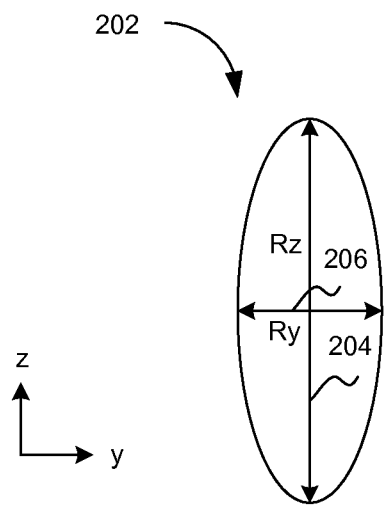
FIG. 5 illustrates an example schematic diagram of a PSF of a LCOS projection system for projecting a vertical grating pattern in accordance with the teachings of the present invention.

FIG. 5 illustrates an example schematic diagram of a point spread function (PSF) 202 of a LCOS projection system (not shown) for projecting a vertical grating pattern 200 in accordance with the teachings of the present invention. As shown in the depicted example, the radius of PSF 202 along the z-axis (Rz) 204 is larger than the radius of PSF 202 along the y-axis (Ry) 206. Thus, the resolution in the z-axis is less than the resolution in the y-axis. The resolution of an image depends on the aperture of the lens, i.e., a larger aperture provides better resolution, i.e., a smaller PSF, and vice versa. PSF 202 may correspond to a truncated circular lens having smaller aperture in the z-axis and larger aperture in the y-axis.

Figure 6:
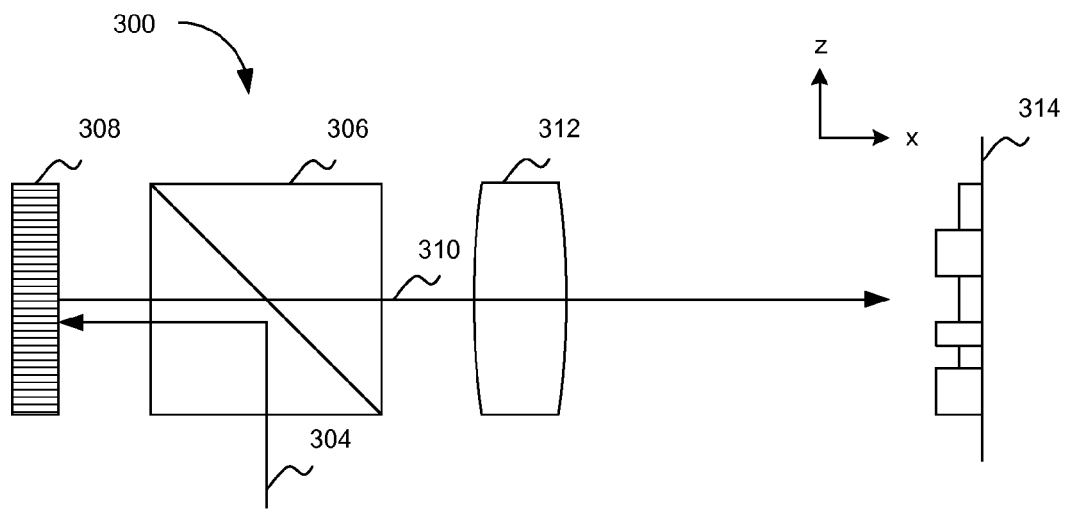
FIG. 6 illustrates an example schematic x-z plane cross-sectional diagram of a low Z-height LCOS projection system in accordance with the teachings of the present invention.

FIG. 6 illustrates an example schematic x-z plane cross-sectional diagram of a low Z-height LCOS projection system 300 in accordance with the teachings of the present invention.

As shown in the example depicted in FIG. 6, illuminating light 304 illuminates a LCOS display panel 308 through a beamsplitter 306. Beamsplitter 306 reflects illuminating light 304 toward LCOS display panel 308. Illuminating light 304 may be from a single light source or from multiple light sources having different wavelengths such as for example lasers, light emitting diodes (LEDs), and other types of light sources. Illuminating light 304 may be collimated. Assuming LCOS display panel 308 is a reflective type, light 310 that is modulated by LCOS display panel 308 is reflected from LCOS display panel 308 and passes back through beamsplitter 306 and through a projection lens 312. For simplicity, projection lens 312 is assumed to be a single lens. However, projection lens 312 may be a lens system that may include a combination of lenses. As shown in the illustrated example, projection lens 312 projects, i.e., images, a vertical grating pattern 200 displayed on LCOS display panel 308 onto a surface 314 having a profile. Vertical grating pattern 200 comprises gratings extended in the z-axis. Surface 314 is equivalent to surface 108 of FIG. 1. Projection lens 312 is a circular lens that can image vertical grating pattern 200 displayed on LCOS display panel 308 onto surface 314 having a profile. Circular projection lens 312 may be a spheric or aspheric lens.

Figure 7:
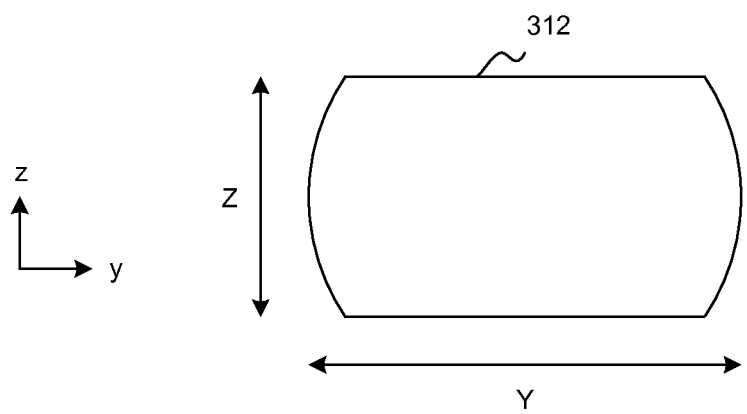
FIG. 7 illustrates an example schematic y-z plane cross-sectional diagram of a projection lens in accordance with the teachings of the present invention.

FIG. 7 illustrates an example schematic y-z plane cross-sectional diagram of projection lens 312 in accordance with the teachings of the present invention. As shown in the illustrated example, projection lens 312 is a truncated circular lens having smaller lens width Z along the z-axis and larger lens width Y along the y-axis, where Z is smaller than Y. Accordingly, the image formed by projection lens 312 has lower resolution along the z-axis and higher resolution along the y-axis, as indicated by PSF 202 of FIG. 5. Truncated circular projection lens 312 is used for projecting, i.e., imaging, vertical grating pattern 200, which requires less resolution in the z-axis. Truncated circular projection lens 312 may be a spheric or aspheric lens.

Figure 8A:
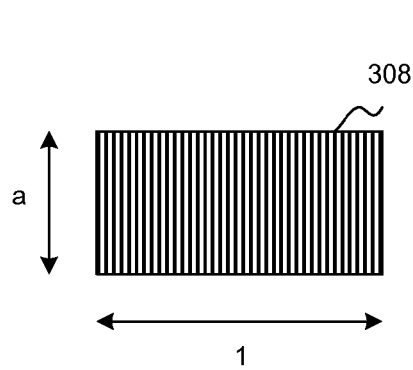
FIG. 8(a) illustrates an example LCOS display panel having a 1:a aspect ratio in accordance with the teachings of the present invention.
Figure 8B:
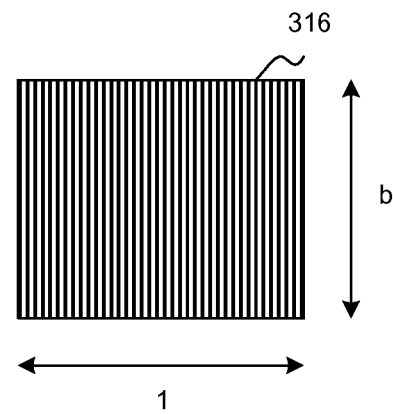
FIG. 8(b) illustrates an example required projected grating pattern having a 1:b aspect ratio in accordance with the teachings of the present invention.

FIG. 8(a) shows an example LCOS display panel 308 having a 1:a aspect ratio in accordance with the teachings of the present invention. However, the 1:a aspect ratio of the projected grating pattern may not match the aspect ratio required by a camera (e.g., camera 104 of FIG. 1). For example, the aspect ratio of a projected grating pattern 316 required by a camera may be 1:b as shown in FIG. 8(b). In one example, an anamorphic lens may be used to adjust the aspect ratio of the projected grating pattern from 1:a to 1:b in accordance with the teachings of the present invention.

Figure 9:
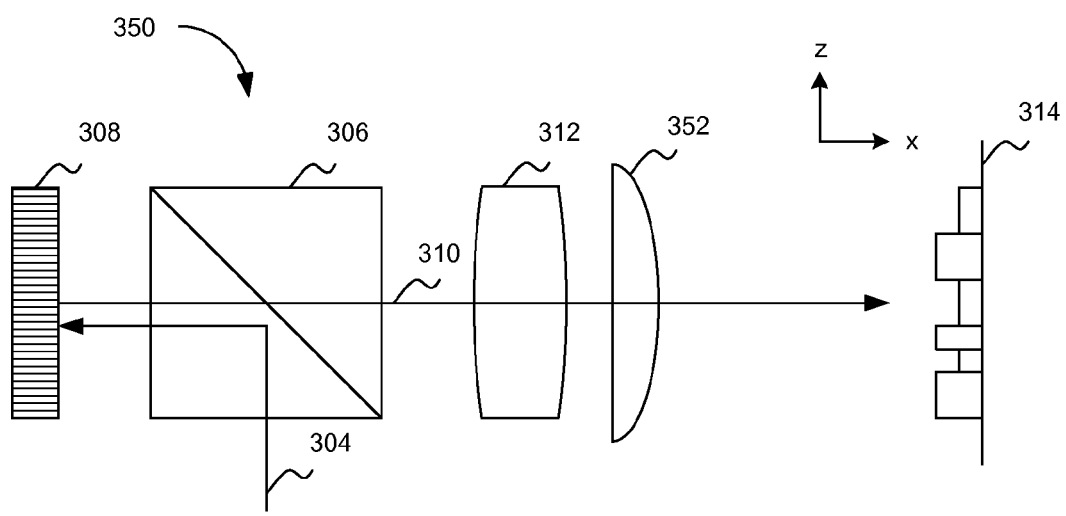
FIG. 9 illustrates another example schematic x-z plane cross-sectional diagram of a low Z-height LCOS projection system in accordance with the teachings of the present invention.

FIG. 9 illustrates another example schematic x-z plane cross-sectional diagram of a low Z-height LCOS projection system 350 in accordance with the teachings of the present invention. It is appreciated that the example illustrated in FIG. 9 shares many similarities with the example illustrated in FIG. 6. One difference is that the example depicted in FIG. 9 includes an additional anamorphic lens 352 for adjusting the aspect ratio of the projected grating pattern. As shown, illuminating light 304 illuminates LCOS display panel 308 through beamsplitter 306. Beamsplitter 306 reflects illuminating light 304 toward LCOS display panel 308. Illuminating light 304 may be from a single light source or multiple light sources having different wavelengths including lasers, LEDs, and other types of light sources. Illuminating light 304 may be collimated. Assuming LCOS display panel 308 is a reflective type, light 310 modulated by LCOS display panel 308 is reflected from LCOS display panel 308 and passes through the same beamsplitter 306, through truncated circular projection lens 312, and through anamorphic lens 352 onto surface 314. Truncated circular projection lens 312 projects, i.e., images, vertical grating pattern 200 displayed on LCOS display panel 308 onto surface 314 having a profile. In the example, vertical grating pattern 200 includes gratings extended in the z-axis. Anamorphic lens 352 is disposed between truncated circular projection lens 312 and surface 314, and is configured to adjust the magnification of the image of grating pattern 200 in the z-axis, but not change the image of grating pattern 200 in the y-axis. Accordingly, the original aspect ratio of 1:a can be modified to the required aspect ratio of 1:b in accordance with the teachings of the present invention.

Figure 10:
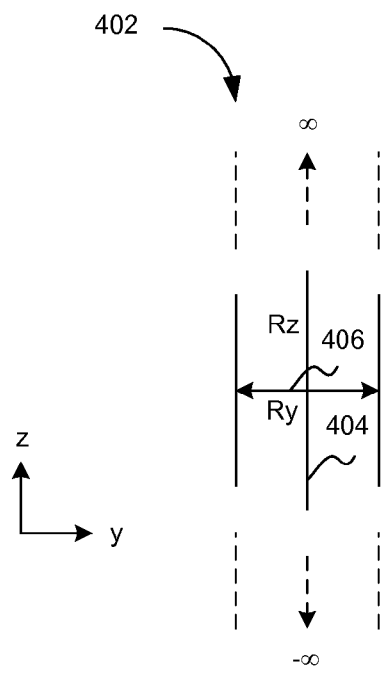
FIG. 10 illustrates an example schematic diagram of a PSF of a LCOS projection system for projecting a vertical grating pattern in accordance with the teachings of the present invention.

Referring breifly back to the example depicted in FIG. 5, PSF 202 has radius along the z-axis (Rz) 204, which is larger than radius in the y-axis (Ry) 206. One may further extend Rz to a value that approaches infinity while keeping Ry unchanged, as shown in FIG. 10. FIG. 10 illustrates an example schematic diagram of a PSF 402 of a LCOS projection system (not shown) for projecting a vertical grating pattern 200 in accordance with the teachings of the present invention. As shown in the example, the radius along the z-axis (Rz) 404 approaches infinity, while the radius along the y-axis (Ry) 406 is limited. Thus, there is no resolution along the z-axis. PSF 402 may correspond to an anamorphic lens having optical power only in the y-axis.

Figure 11:
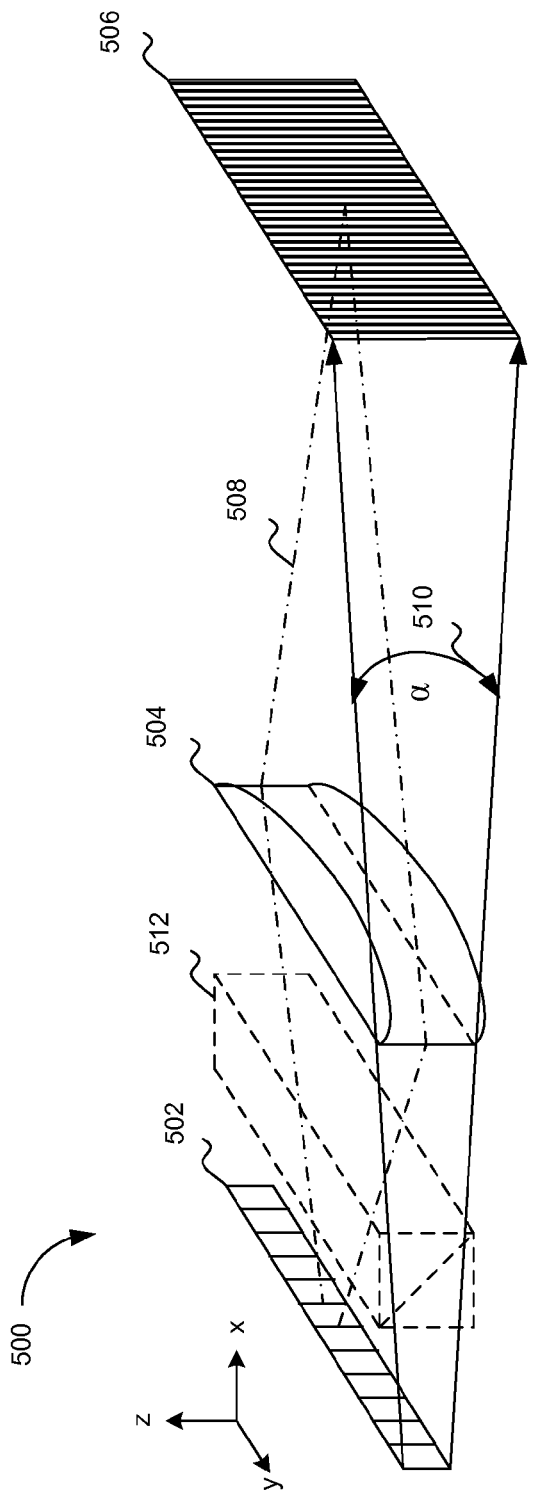
FIG. 11 illustrates an example schematic diagram of a low Z-height LCOS projection system in accordance with the teachings of the present invention.

FIG. 11 illustrates an example schematic diagram of a low Z-height LCOS projection system 500 in accordance with the teachings of the present invention. As shown in the example illustrations of FIG. 6 and FIG. 9, LCOS display panel 308 may include a 2D pixel array having an aspect ratio of 1:a as shown in FIG. 8(a). Accordingly, the Z-height of projection lens 312, e.g., Z of FIG. 7, may match the height of LCOS display panel 308. In the example illustrated in FIG. 11, an LCOS display panel 502 has at least, but is not limited to, one row of pixels, for example arranged along the horizontal y-axis. An anamorphic lens 504 having optical power in the y-axis is used to image LCOS display panel 502 on a surface 506 in the y-axis, as shown by example light paths 508. LCOS display panel 502 displays a horizontal row of a dot pattern. The image formed is thus a row of the dot pattern along the horizontal y-axis. The horizontal row of the dot pattern may be expanded vertically into a vertical grating pattern using a diverging illuminating light having a vertical diverging angle α 510. In this manner, the Z-height of anamorphic projection lens 504 needs only to match vertical diverging angle α 510. In other words, the Z-height, e.g., the lens width in the z-axis of the anamorphic projection lens 504 corresponds to the vertical diverging angle α 510. If the LCOS display panel is a reflective type, a beamsplitter 512 may be disposed between LCOS display panel 502 and anamorphic projection lens 504. If LCOS display is transmissive type, no beamsplitter is included, and the illumination is provided from the rear of LCOS display panel 502.

Figure 12:
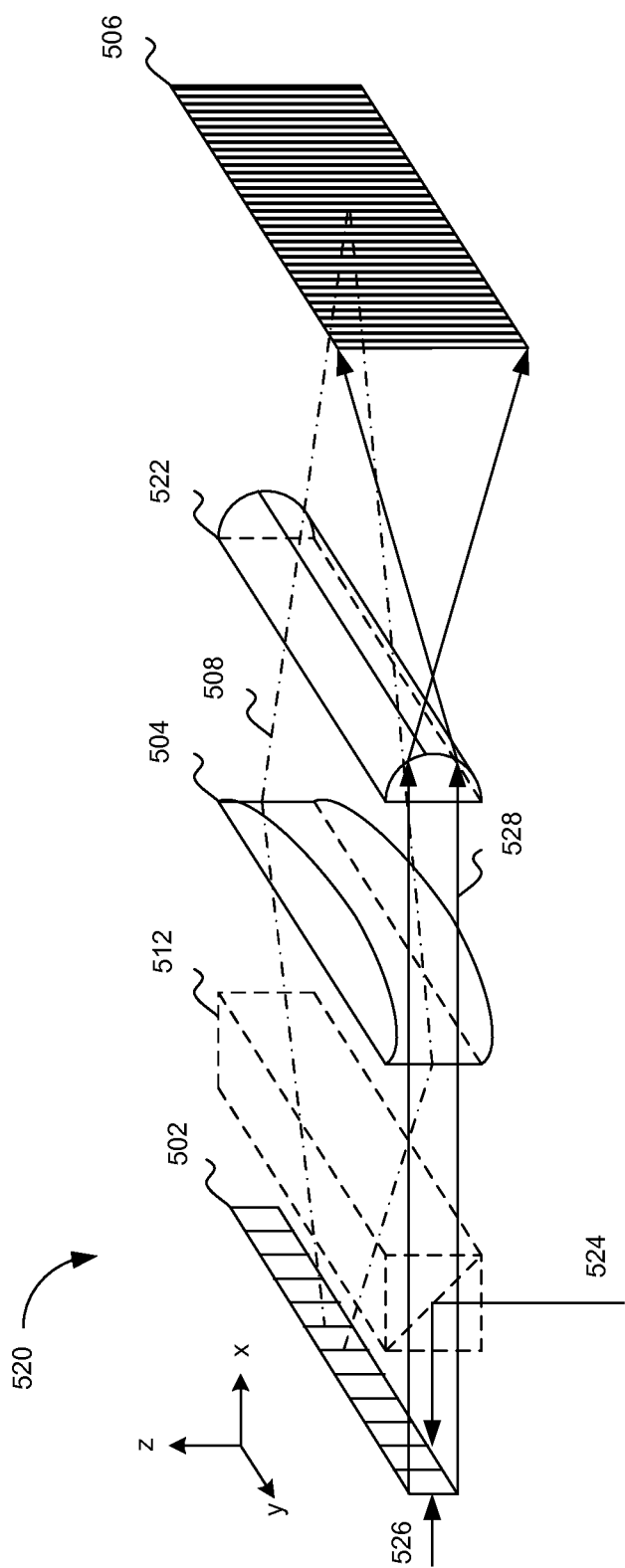
FIG. 12 illustrates an example schematic diagram of a low Z-height LCOS projection system in accordance with the teachings of the present invention.

FIG. 12 illustrates another example schematic diagram of a low Z-height LCOS projection system 520 in accordance with the teachings of the present invention. In the example illustrations of FIG. 6 and FIG. 9, LCOS display panel 308 may include a 2D pixel array having an aspect ratio of 1:a as shown in FIG. 8(a). Accordingly, the Z-height of projection lens 312, e.g., Z of FIG. 7, may match the height of LCOS display panel 308. In the example illustrated in FIG. 12, an LCOS display panel 502 has at least, but is not limited to, one row of pixels, for example along the horizontal y-axis. An illuminating light 524 for a reflective type LCOS display panel 502 or an illuminating light 526 for a transmissive type LCOS display panel 502 may be collimated. Light 528, after being modulated by LCOS display panel 502, may also be collimated. A first anamorphic lens 504 having optical power in the y-axis is used to image LCOS display panel 502 on a surface 506 in the y-axis, as shown by exemplary light paths 508. LCOS display panel 502 displays a horizontal row of a dot pattern. The image formed is thus a row of a dot pattern along the horizontal y-axis. In this manner, the Z-height of first anamorphic projection lens 504 needs only to match the height of collimated beam 528, which is determined by the height of LCOS display panel 502. The height of LCOS display panel 502 may be as small as a pixel height.

The image formed, which is a horizontal row of a dot pattern, may be expanded vertically into a vertical grating pattern using a second orthogonal anamorphic lens 522 having optical power along the vertical z-axis. As shown in the example depicted in FIG. 12, the respective Z-heights of first anamorphic lens 504 and second orthogonal anamorphic lens 522 need only to match the height of collimated beam 528, which is determined by the height of LCOS display panel 502. In other words, the Z-heights, e.g., the respective lens widths in the z-axis of first anamorphic lens 504 and second orthogonal anamorphic lens 522 correspond to the height of collimated beam 528, which is determined by the height of LCOS display panel 502. The height of LCOS display panel 502 may be as small as a pixel height. The aspect ratio of the projected grating pattern on surface 506 can be adjusted by controlling the magnification of first anamorphic lens 504 and the magnification of second orthogonal anamorphic lens 522.

Furthermore, first anamorphic lens 504 and second orthogonal anamorphic lens 522 may be combined into a single lens having orthogonal anamorphic surfaces. FIG. 13(a) illustrates an example schematic diagram of a combined orthogonal anamorphic lens 600 including a first anamorphic lens 504 and a second orthogonal anamorphic lens 522 in a perspective view according to exemplary embodiments. FIG. 13(b) and FIG. 13(c) show the cross-sections of combined orthogonal anamorphic lens 600 in the y-x plane and the z-x plane, respectively. In principle, either first anamorphic lens 504 or second anamorphic lens 522 may face LCOS display panel 502.

Although LCOS display panels are described in the disclosure as examples, the teachings of the present invention are not limited to LCOS display panels. It is appreciated that any transmissive or reflective display panels can be used, including a liquid crystal (LC) display, a digital light processor (DLP), a digital micromirror device (DMD), etc, which are equivalent to a LCOS display panel. The display panel may be monochrome, color, binary, gray scale, or polarization encoded.

For simplicity, in the description, the truncated circular projection lens has been illustrated as a single lens. However, the truncated circular projection lens is a lens system that may be a single lens or a combination of lenses.

Furthermore, for all anamorphic lenses described in the disclosure, both anamorphic lenses having positive or negative optical powers may be used as well. The anamorphic lenses are characterized by the described directions of the optical powers.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

What is claimed is:

1. A low Z-height projection system comprising:
   a display panel to display a grating pattern including gratings extended in a first direction; and
   a projection lens system through which the grating pattern displayed on the display panel is projected onto a surface, wherein the projection lens system is a truncated circular lens system having a projection lens, wherein the projection lens has a first lens width in the first direction, wherein the projection lens has a second lens width in a second direction, wherein the first lens width of the projection lens is less than the second lens width of the projection lens, and wherein the first and second directions are orthogonal.

2. The low Z-height projection system of claim 1 further comprising an anamorphic lens having optical power in the first direction through which the grating pattern displayed on the display panel is projected to adjust an aspect ratio of the projected grating pattern.

3. The low Z-height projection system of claim 1 further comprising a beamsplitter disposed between the display panel and the projection lens system.

4. The low Z-height projection system of claim 1, wherein the display panel is one of liquid-crystal-on-silicon (LCOS), liquid crystal (LC), digital-light-processor (DLP), and digital micromirror device (DMD) display panels.

5. The low Z-height projection system of claim 1, wherein the projection lens system includes at least one lens.

6. A low Z-height projection system comprising:
   a display panel having at least one row of pixels arranged along a first direction;
   a first anamorphic lens having optical power in the first direction to image the at least one row of pixels arranged along the first direction of the display panel onto a surface; and
   a diverging illuminating light having a diverging angle α in a second direction, wherein the first and second directions are orthogonal, wherein a height of the first anamorphic lens in the second direction is corresponding to the diverging angle α in the second direction.

7. A low Z-height projection system, comprising:
   a display panel having a single row of pixels arranged along a first direction;
   a first anamorphic lens having optical power in the first direction to image the single row of pixels arranged along the first direction of the display panel onto a surface;
   a collimated illuminating light; and
   a second anamorphic lens having optical power in a second direction to expand in the second direction the image of each pixel of the at least one row of pixels arranged along the first direction on the surface, wherein the first and second directions are orthogonal.

8. The low Z-height projection system of claim 7, wherein a height of the first anamorphic lens in the second direction and a height of the second anamorphic lens in the second direction correspond to a height of the collimated illuminating light.

9. The low Z-height projection system of claim 8, wherein the height of the collimated illuminating light is a height of a pixel of the single row of pixels arranged along the first direction.

10. The low Z-height projection system of claim 7 further comprising a beamsplitter disposed between the display panel and the first anamorphic lens.

11. The low Z-height projection system of claim 7 wherein the first anamorphic lens and the second anamorphic lens are combined into a single lens having orthogonal anamorphic surfaces.

12. The low Z-height projection system of claim 7, wherein the display panel is one of liquid-crystal-on-silicon (LCOS), liquid crystal (LC), digital-light-processor (DLP), and digital micromirror device (DMD) display panels.

13. A method for projecting a grating pattern comprising:
   displaying the grating pattern on a display panel, wherein the grating pattern includes gratings extended in a first direction; and
   projecting the grating pattern including gratings extended in the first direction using a truncated circular lens system having a projection lens, wherein the projection lens has a first lens width in the first direction, wherein the projection lens has a second lens width in a second direction, wherein the first lens width of the projection lens is less than the second lens width of the projection lens, wherein the first and second directions are orthogonal, and wherein a resolution of the truncated circular lens system in the first direction is less than a resolution of the truncated circular lens system in the second direction.

14. The method of claim 13 further comprising adjusting an aspect ratio of the projected grating pattern included gratings extended in the first direction using an anamorphic lens having optical power in the first direction.

15. A method for forming a grating pattern comprising:
   displaying a row of a dot pattern on a display panel having at least one row of pixels arranged along a first direction; and
   imaging the row of the dot pattern displayed on the display panel having the single row of pixels arranged along the first direction using a first anamorphic lens having optical power in the first direction.

16. The method of claim 15 further comprising expanding the image of the row of the dot pattern in a second direction using a second anamorphic lens having optical power in the second direction to form the grating pattern comprising gratings extended in the second direction, wherein the first and second directions are orthogonal.

17. The method of claim 16 wherein the first anamorphic lens and the second anamorphic lens are combined into a single lens having orthogonal anamorphic surfaces.

* * * * *